US012129684B2

(12) United States Patent
Zheng

(10) Patent No.: US 12,129,684 B2
(45) Date of Patent: Oct. 29, 2024

(54) INDICATOR LOCK FOR A PUBLIC SERVICE ROOM DOOR

(71) Applicants: PIN GENIE Limited, Kowloon (HK); Li Zheng, Kowloon (HK)

(72) Inventor: Li Zheng, Kowloon (HK)

(73) Assignee: PIN GENIE Limited, Hong Kong (HK)

( * ) Notice: Subject to any disclaimer, the term of this patent is extended or adjusted under 35 U.S.C. 154(b) by 239 days.

(21) Appl. No.: 17/899,994

(22) Filed: Aug. 31, 2022

(65) Prior Publication Data

US 2024/0068272 A1 Feb. 29, 2024

(51) Int. Cl.
*E05B 41/00* (2006.01)
*E05B 17/22* (2006.01)
*E05B 39/00* (2006.01)

(52) U.S. Cl.
CPC .............. *E05B 41/00* (2013.01); *E05B 17/22* (2013.01); *E05B 17/226* (2013.01); *E05B 39/00* (2013.01)

(58) Field of Classification Search
CPC ........ E05B 17/22; E05B 17/226; E05B 39/00; E05B 39/007; E05B 41/00
See application file for complete search history.

(56) References Cited

U.S. PATENT DOCUMENTS

| | | | | |
|---|---|---|---|---|
| 1,099,106 A * | 6/1914 | Wevat | E05B 41/00 | 40/907 |
| 1,529,766 A * | 3/1925 | Bina | G09F 7/00 | 40/907 |
| 2,455,208 A * | 11/1948 | Wirth | E05B 41/00 | 40/907 |
| 4,559,796 A * | 12/1985 | De, Sr. | E05B 41/00 | 70/432 |
| 9,169,669 B2 * | 10/2015 | Clary | E05B 41/00 | |
| 11,486,163 B2 * | 11/2022 | Sweeney | E05B 15/02 | |
| 2004/0187533 A1 * | 9/2004 | Huang | E05B 41/00 | 70/432 |
| 2011/0016938 A1 * | 1/2011 | Chi | E05B 65/0035 | 70/432 |
| 2022/0389740 A1 * | 12/2022 | Hoiland | E05B 65/1053 | |

* cited by examiner

*Primary Examiner* — Christopher J Boswell
(74) *Attorney, Agent, or Firm* — Lerner David LLP

(57) ABSTRACT

An indication box used with an electronic smart lock indicates if a public service room is in use. A color plate partially shown in a window moves vertically up and down with door handle motion. Unlike other indicators, the door handle and not lock actives use indication to avoid mishaps from forgetting to lock the door. The color plate is spring loaded with a V-shaped bottom. The color plate vertically moves by a cam having two L-shaped portions forming a V-shaped recess to initially secure the color plate's V-shaped bottom. Cam activation is through a dial head that moves with the door handle. When the color plate indicates use, the V-Shaped bottom rests on one of the cam's L-shaped portions. The color plate may also include braille markings. The indication box is used on a door's front portion with any electronic smart lock design and operates without electrical power.

20 Claims, 10 Drawing Sheets

INDICATOR LOCK FOR A PUBLIC SERVICE ROOM DOOR

FIELD OF USE

The present application relates to the field of door locking apparatus and methods to facilitate indication of a locked door. Specifically, the present application discloses an indicator assembly that may be attached to any smart door or electronic door lock to indicate when a public service room door is in use and locked.

BACKGROUND OF THE INVENTION

It is exceedingly difficult or impossible to determine whether a conventional door lock is in a locked or unlocked condition. The need to determine whether a door lock is in a locked or unlocked condition can be particularly significant when a door lock is used in a public service room or restroom. If there is no indication on the door that it is locked, an individual approaching such a door may find that it does not open. As a result, the individual may attempt to unlock a door lock that is already in a locked condition with no outside indication that the door is locked. This action can result in frustration and additional wasted effort.

Some conventional devices have attempted to address this need. For example, U.S. Pat. No. 4,559,796 (US'796) discloses "a status indicator for a door lock." The status indicator disclosed in US'796 is deficient, in part, because it cannot be installed on an existing door lock without first disassembling the door lock assembly. As another example, U.S. Pat. No. 6,255,957 (US'957) discloses a system including a key with a display and sensors that interact with markers in a door lock. The system disclosed in US'957 is deficient, in part, due to its complexity, its expense, and its inability to account for operations of the door lock with more than one key or an electronic door lock.

When a smart lock or electronic lock is used in some public and private places, it is impossible to clearly let people know whether the private place is used by anyone. If an electronic light prompt is added, it will reduce the battery life of the smart lock. Furthermore, traditional door lock indicators rotate only when the door lock or door lock knob is turned to indicate a locked door. This situation may complicate matters if a person enters the public service room and forgets to rotate the door lock knob when closing the door.

Current state of the art door lock indicator has many drawbacks. Many indicators cannot be utilized with current door locks and smart electronic locks. In addition, many current door indicators require the turning of the door lock knob instead of the door handle itself. In addition, if an electronic light prompt is used with the electronic or smart door lock, it will reduce the battery life of the smart lock. The current technology offered today by some of the world's largest companies cannot solve some of the technological issues, and their technologies are not cost-effective.

The industry yearns for low cost solutions and a way to indicate when a smart lock in public and private places is activated and locked. Therefore, there still exists a critical need in the art for an effective indicator mechanism that is adaptable to fit on an existing smart lock door, user friendly, and enhanced at a low operating cost.

SUMMARY OF THE INVENTION

Compared to the above prior attempts, the presently disclosed apparatus and methods solve the problems of current state of the art, meet the above requirements, and provide many more benefits. The present disclosure is a unique mechanical notification or indicator box apparatus that provides many benefits. The technical improvement includes, but is not limited to, adding a mechanical color prompt box to indicate whether the room that is locked by a smart lock is in use and occupied or unoccupied. When the prompt box shows one color, for example, green, it means that the place is not in use. When the indicator shows a second color, for example, red, it means that the place is being used. Tackle feel or braille indicators may also be used for the sight impaired user. In addition, pictures or symbols may be used. Any of the above indicators, colors, indicia, symbols, braille, and the like may be used individually or in any combination thereof. The apparatus may be used with a pre-existing smart lock and does not require any electronics or electrical power that would drain the life of the smart lock. Therefore the apparatus has universal use with any smart lock design.

In addition, the indicator box apparatus is not activated by turning the door lock knob like prior art devices. Instead, the apparatus is activated by turning the door handle itself. Therefore, if a user forgets to lock the door, a simple turn of the door handle will activate the notification mechanism and show that the room is occupied. In addition, prior art devices have rotating indicator signs or colors on the door that may stop in between colors because they are activated by turning the door lock knob. This in-between indication caused by prior art devices leads to confusion by users.

In contrast, the current apparatus has a color plate with a top notification area and a bottom notification area. The color plate moves up and down in a linear and vertical direction instead of rotating like the prior art devices. In addition, the color plate moves in response to the turning of the door handle and not the door lock knob, thereby avoiding mishaps.

In one aspect, the apparatus includes the following components and functions. An indication box for use with an electronic smart lock on a public service room door, comprising: a housing having a front side, a back side, an upper portion, and a lower portion; the upper portion defining a rectangular display window; the lower portion further defining a first set of three holes in horizontal alignment for insertion of a front piece of a smart lock outside door handle into the front side of the housing; the smart lock door outside handle having at least two support rods and a door shaft therebetween in horizontal alignment for insertion into the first set of three holes; the first set of three holes surrounded by a circular recessed area; the housing further defining a first vertical slit disposed in a center of the housing; a bottom plate having a matching rectangular shape same as the housing connected to the back side of the housing and disposed on a front of a public service room door; the bottom plate further defining a second set of three holes in horizontal alignment with the first set for insertion of the two support rods and the door shaft through the front of the public service room door; the bottom plate further defining a second vertical slit disposed in a center of the back plate; and wherein the first vertical slit and the second vertical slit are aligned.

The apparatus further includes a color plate having a square shaped upper portion and a V-shaped lower portion; the square shaped upper portion having a first notification area and a second notification area stacked on top of each other and facing the rectangular display window wherein only one notification area is shown in the rectangular display window at a time; the color plate disposed between the housing and the back plate; the color plate defining a third vertical slit and a fourth vertical slit; both the third vertical slit and the fourth vertical slits are vertically aligned with each other and aligned with the first slit of the housing and the second slit of the bottom plate; the third and the fourth vertical slits disposed in a center of the color plate; and the center of the color plate having a vertical canal between the third and the fourth vertical slits; a spring disposed within the third vertical slit; the spring having a shaft pin therethrough; the shaft pin disposed within the third and the fourth vertical slits and the shaft pin through the vertical canal; a cam disposed below the color plate and within the circular recessed area of the housing; the cam having a circular shape and defining a cam hole in a center of the cam to receive the door shaft to pass therethrough; wherein the door shaft does not rotate the cam; the cam also defining a semi-circular recess on a bottom of the cam; wherein, the cam further having a left and a right L-shaped tabs that are mirror images of each other on a top of the cam forming a V-shaped recess therebetween to hold the V-shaped lower portion of the color plate in a stationary position when the spring is uncompressed; wherein, the left and right L-shaped tabs each having a cam depression with two releasable snap-fittings on both ends of each of the cam depression to hold the V-shaped lower portion of the color plate inside the depression of the cam when the cam moves so the color plate can move upward in the linear vertical direction to compress the spring; a circular dial head disposed within the cam hole; the circular dial head further defining a dial head hole having a plurality of segregated teeth 55 therein; the cam hole for receiving the door shaft to move the dial head within the cam; the circular dial head further having a protrusion that is in communication with the semi-circular recess of the bottom of the cam; and wherein the protrusion of the dial head moves the cam when an outside door handle or an inside door handle is turned.

When the spring is uncompressed, the color plate is at the stationary position and the V-shaped bottom is within the V-shaped recess for showing the first notification area on the color plate in the rectangular display window of the housing. When the spring is compressed when the outside door handle is initially turned, the color plate moves upward in a linear vertical direction and the second notification area on the color plate is shown in the rectangular display window of the housing. The spring remains compressed when the outside door handle is released for the second notification area on the color plate to be continually shown in the window as the V-shaped lower portion of the color plate is held inside the depression of the cam of the right L-shaped tab to indicate an occupied status of the public service room. When the inside door handle is turned the V-shaped lower portion of the color plate fits therebetween the V-shaped recess of the cam to show the first notification area again in the window of the housing as the compressed spring mechanically pushes the color plate in a downward linear vertical direction without use of electrical power from the electronic smart lock to indicate an unoccupied status of the public service room.

The above aspects and advantages are met by the present invention. In addition, the above and yet other objects and advantages of the present invention will become apparent from the hereinafter-set forth Brief Description of the Drawings, Detailed Description of the Invention and claims appended herewith. These features and other features are described and shown in the following drawings and detailed description.

BRIEF DESCRIPTION OF THE DRAWINGS

So that those having ordinary skills in the art will have a better understanding of how to make and use the disclosed composition and methods, reference is made to the accompanying figures, wherein.

DETAILED DESCRIPTION

Figure 1:
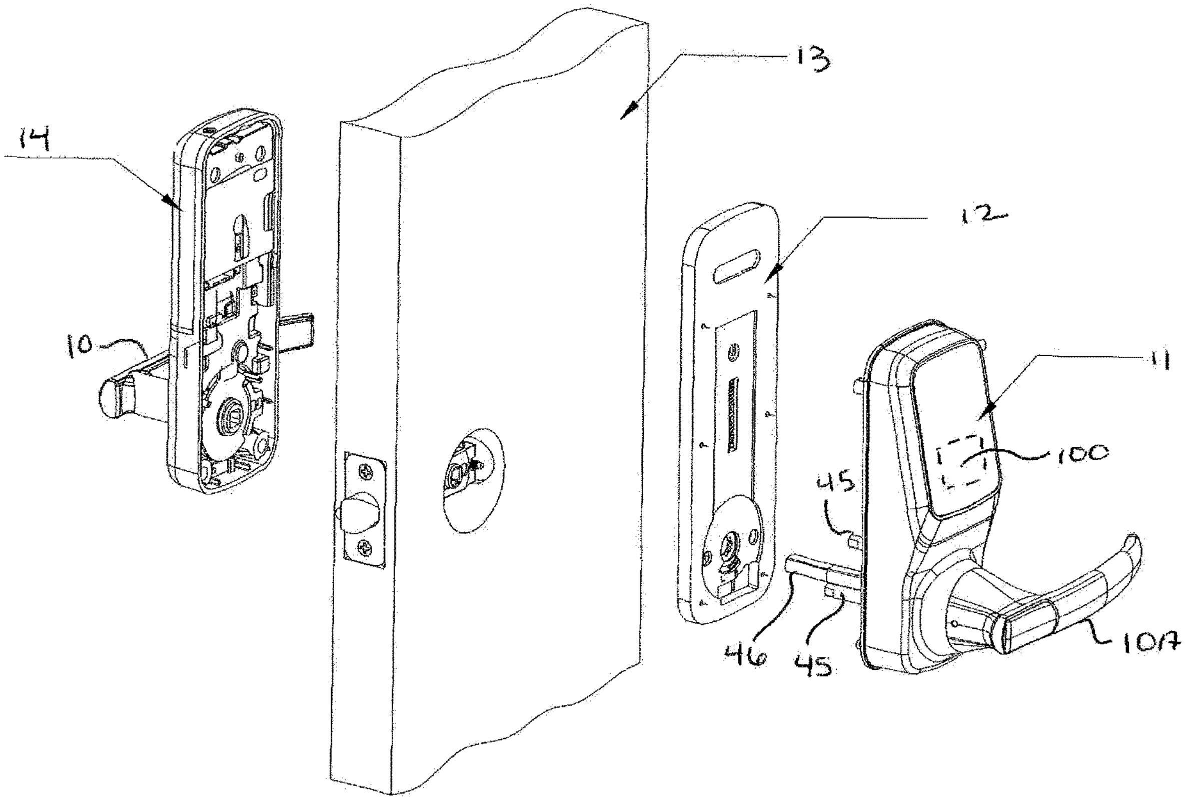
FIG. 1 is a perspective view of one embodiment of the indication box illustrating its position with the front portion of an electronic smart door lock having an inner unit and an outer unit with an inner door handle and an outer door handle, respectively.

The present disclosure is directed to an apparatus and method for an indicator lock for a public or private service room door that utilizes a smart lock or electronic lock. For purposes of this disclosure the use of the words "doorknob" and "door handle" are used interchangeably and have the same meaning, and have a different meaning than "door lock knob." A door lock knob refers to a knob or handle that turns or rotates directly a door lock to the locked or open positions, independent of the doorknob or door handle. The use of the word "lock" when referring to the present invention is meant to refer to a smart lock or an electronic lock powered by a battery or some other electrical power such as but not limited to solar energy, AC or DC current and the like.

An indication box for use with an electronic smart lock on a room door provided by embodiments of the present disclosure may include a housing, a bottom plate, and a color plate therebetween. Wherein the color plate has a first notification area and a second notification area; when the smart lock is locked, only turning of an attached inside door handle of the smart lock moves the color plate in a linear vertical upward direction changing the first notification area shown in a window of the housing that signifies a room is unoccupied, to the second notification area that signifies the room is occupied.

In some embodiments, the indication box comprises:

a housing defining a display window and a first set of holes for insertion of an outer unit of a smart lock having an outside door handle that is inserted into the front side of the housing, and wherein an inner unit of the smart lock having an inside door handle receives a shaft of the outside door handle through a door;

a bottom plate connected to the back side of the housing and disposed on a front of a public service room door;

a color plate having a square shaped upper portion and a V-shaped lower portion; the square shaped upper portion having a first and a second notification areas stacked thereon and facing the rectangular display window; a spring with a shaft pin therethrough disposed within the color plate;

a cam disposed below the color plate to receive a door shaft to pass therethrough; a circular dial head disposed within the cam hole having a plurality of segregated teeth for receiving the door shaft wherein the door shaft through movement of the inside door handle moves the dial head within the cam and then moves the cam to move the color plate in an upward linear and vertical direction to show the second notification area in the window and indicate an occupied status of the room.

Depending on the embodiment, the following components are used in the present apparatus and method. The components include: a housing 1, a shaft pin 2, a spring 3, a cam 5, a dial head 6, a color plate 7, a bottom plate 8, and a plurality of screws 9. The apparatus may also include at least two washers 4 to secure the spring and the shaft pin on the color plate 7.

As shown in FIG. 1, an indication box 12 is universally used with any smart lock door assembly. The front piece of smart lock or outer unit or outside unit 11 shown in this example, has a door handle 10A, a door shaft 46 and supporting rods 45. The indication box 12 is placed between the door 13 and the front piece of the smart lock 11. A back piece of the smart door lock handle or inner unit or inside unit 14 has an inside door handle 10 that attaches on the other side of the door and receives the door shaft 46 and supporting rods 45 that go through the indication box 12. The turning of the handle 10 activates the notification process of the indication box 12 with the turning of the door shaft 46 resets the indication box 12 to indicate the room is unoccupied. When the smart lock is in a locked state, the outside door handle 10A and the inside door handle 10 are not linked and move separately, movement of the outside door handle 10A cannot cause movement of the inside door handle 10; and when the smart lock is in an open state, the outside door handle 10A and the inside door handle 10 are linked, and movement of the outside door handle 10A can cause movement of the inside door handle 10.

Figure 2:
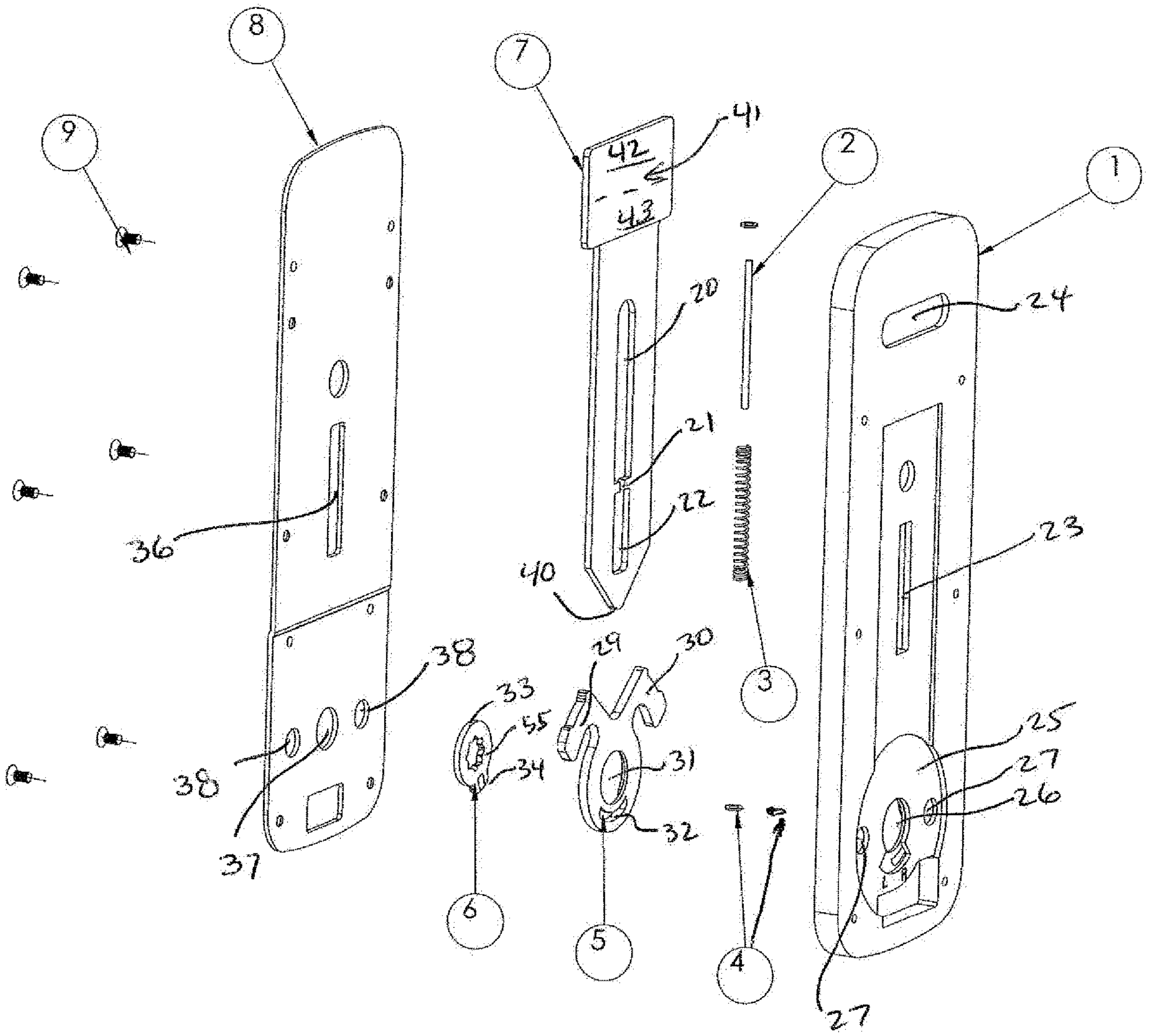
FIG. 2 is a perspective view of a disassembled indication box of FIG. 1 showing the components of the indication box.

FIG. 2 illustrates one embodiment of the indication box 12 shown in FIG. 1. The housing 1 has a front side, a back side, an upper portion, and a lower portion. The shape of housing 1 may be designed according to the shape of the door lock. For example, since most smart lock has a rectangular shape, housing 1 may be rectangular. The upper portion defines a rectangular display window 24 or 1.1. The lower portion of the housing further defines a first set of three holes 26, 27 and 27 in horizontal alignment for insertion of a front piece or outside unit of a smart lock outside door handle into the front side of the rectangular housing. The smart lock door outside door handle has at least two support rods 45 and a door shaft 46 therebetween in horizontal alignment for insertion into the first set of three holes. The first set of three holes is surrounded by a circular recessed area 25. The rectangular housing further defines a first vertical slit 23 disposed in a center of the rectangular housing.

A bottom plate 8 in FIG. 2 has a matching rectangular shape same as the rectangular housing and is connected to the back side of the rectangular housing and disposed on the front of a public service room door. Depending on the embodiment, screws 9 may be used to connect the back plate to the rectangular housing. However any fastener or means of bonding these components may be utilized, including, but not limited to adhesive bonding, ultrasonic welding, heat sealing, and the like. The bottom plate further defines a second set of three holes 37, 38 and 38 in horizontal alignment with the first set for insertion of the two support rods and the door shaft through the front of the public service room door. The bottom plate further defines a second vertical slit 36 disposed in a center of the back plate. The first vertical slit and the second vertical slit are aligned and used to support the spring 3 and shaft pin 2.

The color plate 7 has a square shaped upper portion 41 and a V-shaped lower portion 40. The square shaped upper portion has a first notification area 42 and a second notification area 43 stacked on top of each other and facing the rectangular display window 24 wherein only one notification area is shown in the rectangular display window at a time. The color plate is disposed between the rectangular housing and the back plate. The color plate further defines a third vertical slit 20 and a fourth vertical slit 22. Both the third vertical slit and the fourth vertical slits are vertically aligned with each other and aligned with the first slit of the rectangular housing and the second slit of the bottom plate. The third and the fourth vertical slits are disposed in a center of the color plate. The center of the color plate has a vertical canal 21 between the third and the fourth vertical slits. The spring 3 is disposed within the third vertical slit 20. The spring has the shaft pin 2 therethrough. The shaft pin is disposed within the third and the fourth vertical slits and the shaft pin 2 is through the vertical canal. Washers 4 secures the shaft pin.

Figure 3:
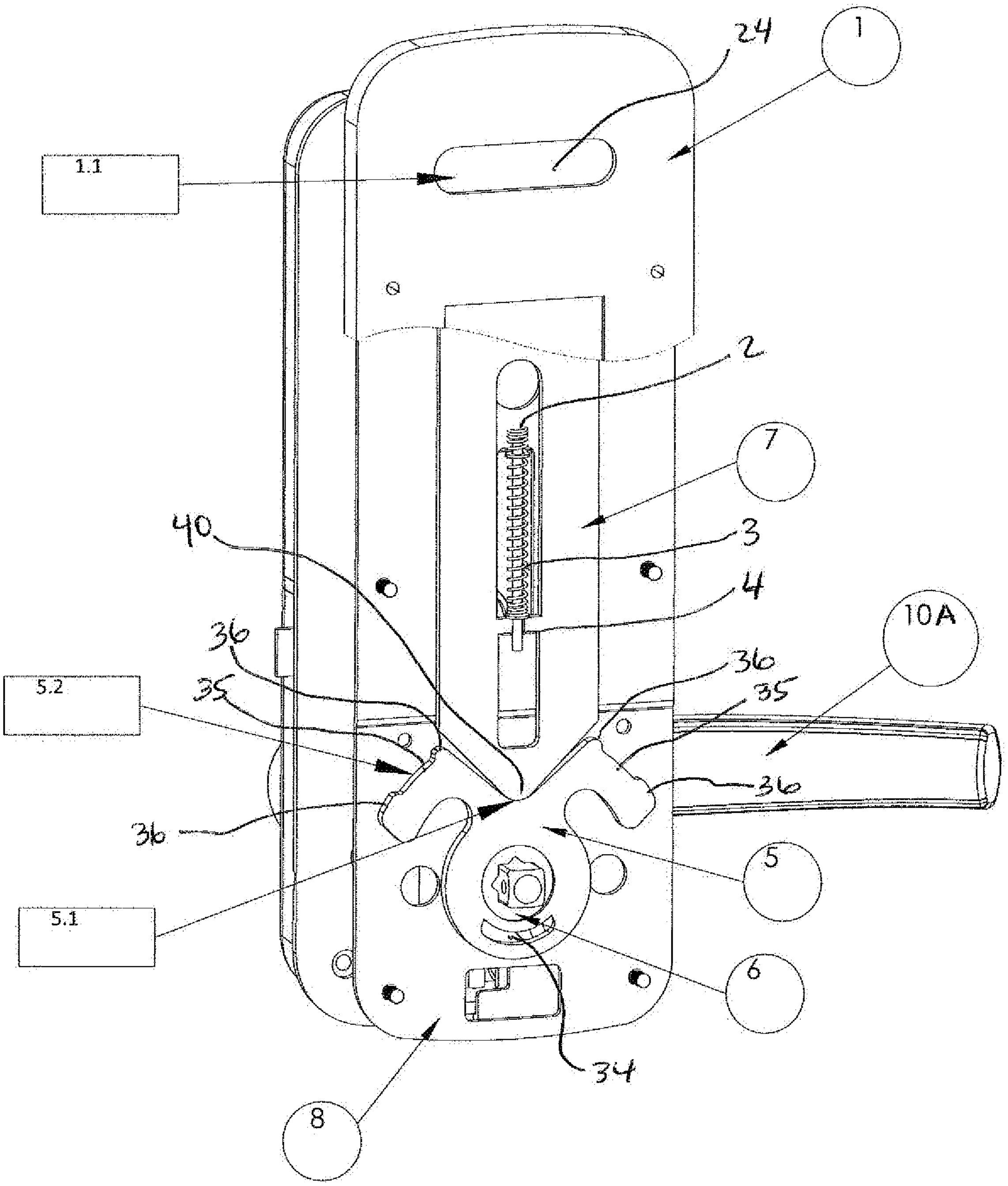
FIG. 3 illustrates the assembled indication box of FIG. 1 without a bottom plate to show the position of a color plate related to a cam in the color plate's initial first setting indicating vacancy in the service room.
Figure 4:
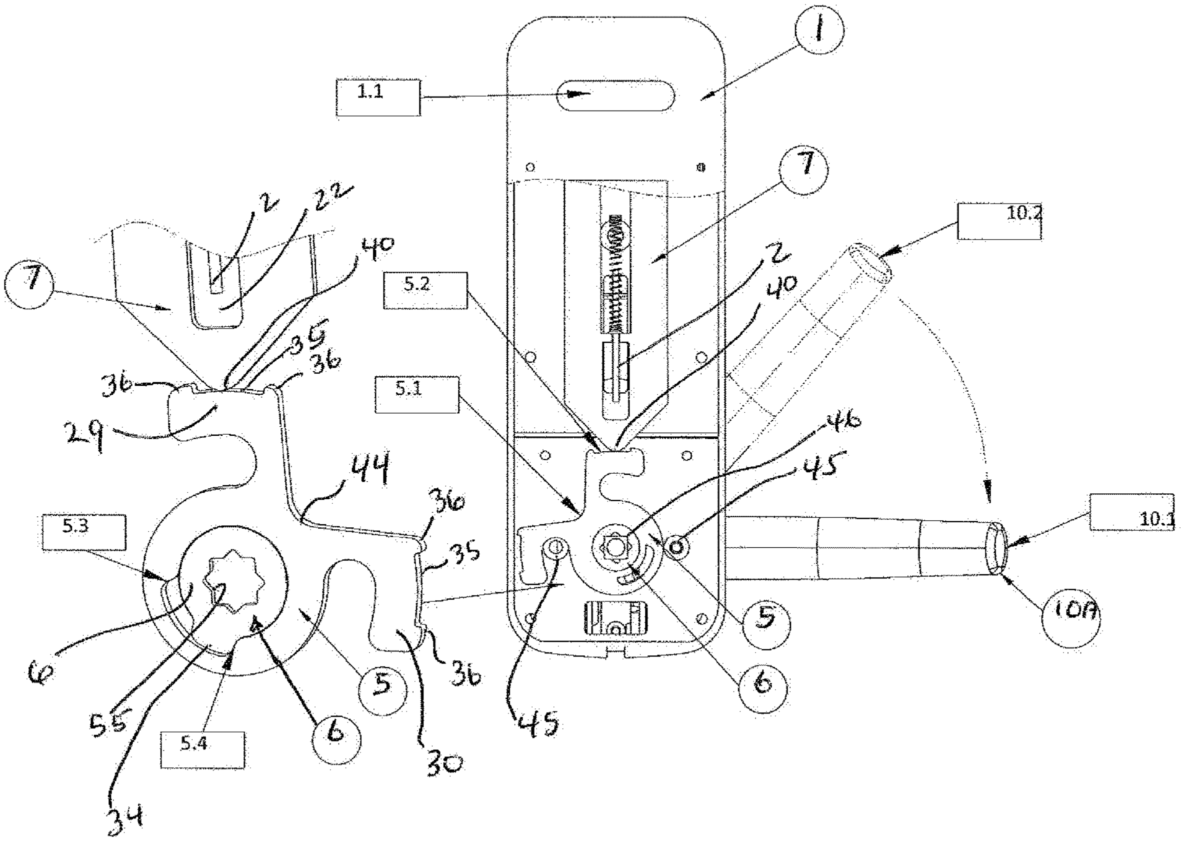
FIG. 4 illustrates the assembled indication box of FIG. 3 when the doorknob is moved and the cam moves the color plate in an upward vertical position indicating no vacancy in the service room.

The cam 5 is disposed below the color plate and within the circular recessed area 25 of the rectangular housing. The cam 5 has a circular shape and defines a cam hole 31 in a center of the cam to receive the door shaft 46 to pass therethrough. The door shaft does not rotate the cam. The cam also defines a semi-circular recess 32 on a bottom 28 of the cam. The cam further has a left L-shaped tab 29 and a right L-shaped tab 30 that are mirror images of each other on a top of the cam forming a V-shaped recess 44 therebetween to hold the V-shaped lower portion 40 of the color plate 7 in a stationary position when the spring is uncompressed. As shown in FIG. 3 and FIG. 4, the left and right L-shaped tabs each have a cam depression 35 with two releasable snap-fittings 36 on both ends of each of the cam depression to hold the V-shaped lower portion 40 of the color plate 7 inside the depression of the cam when the cam moves so the color plate can move upward in the linear vertical direction to compress the spring and indicate the room is occupied by showing notification area 43 in window 24 of the rectangular housing.

A circular dial head 33 is disposed within the cam hole 31. The circular dial head 33 further defines a dial head hole having a plurality of segregated teeth 55 therein. The cam hole and segregated teeth are for receiving the door shaft to move the dial head within the cam. The circular dial head further has a protrusion 34 that is in communication with the semi-circular recess 32 of the bottom of the cam. The protrusion 34 of the dial head moves the cam 5 when the outside door handle 10A or inside door handle 10 are turned.

When the spring is uncompressed, the color plate is at the stationary position and the V-shaped bottom 40 is within the V-shaped recess 44 for showing the first notification area 42 on the color plate 7 in the rectangular display window of the rectangular housing. When the spring is compressed as the outside door handle 10A is initially turned, the color plate moves upward in a linear vertical direction and the second notification area 43 on the color plate is shown in the rectangular display window of the rectangular housing indicating the room is occupied. The spring remains compressed when the outside door handle 10A is released for the second notification area 43 on the color plate to be continually shown in the window as the V-shaped lower portion of the color plate is held inside the depression of the cam of the right L-shaped tab to indicate an occupied status of the public service room.

When the inside door handle 10 of the inner unit 14 is turned, the V-shaped lower portion of the color plate fits therebetween the V-shaped recess of the cam to show the first notification area 42 again in the window of the housing as the compressed spring mechanically pushes the color plate in a downward linear vertical direction without use of electrical power from the smart lock to indicate an unoccupied status of the public service room.

When a public service room is not in use, the display window 1.1 on the housing 1 of the prompt or indication box 12 is displayed in green, for example, indicating that the place is not in use (see FIG. 3). When someone wants to use the room, they can lift the outside door handle 10A from positions 10.1 to 10.2 after entering the room. At this time, the door handle 10A of the indoor unit drives the dial 6 and the cam 5 to rotate, and the color plate 7 cooperates with the cam 5, and the color plate 7 will move from 5.1 to 5.2 position, so that the color plate 7 moves linearly and vertically upward. Therefore, the position display of 1.1 of the display window on the housing 1 turns red or some other indication as previously discussed to indicate the room is occupied (see FIG. 4).

Figure 5:
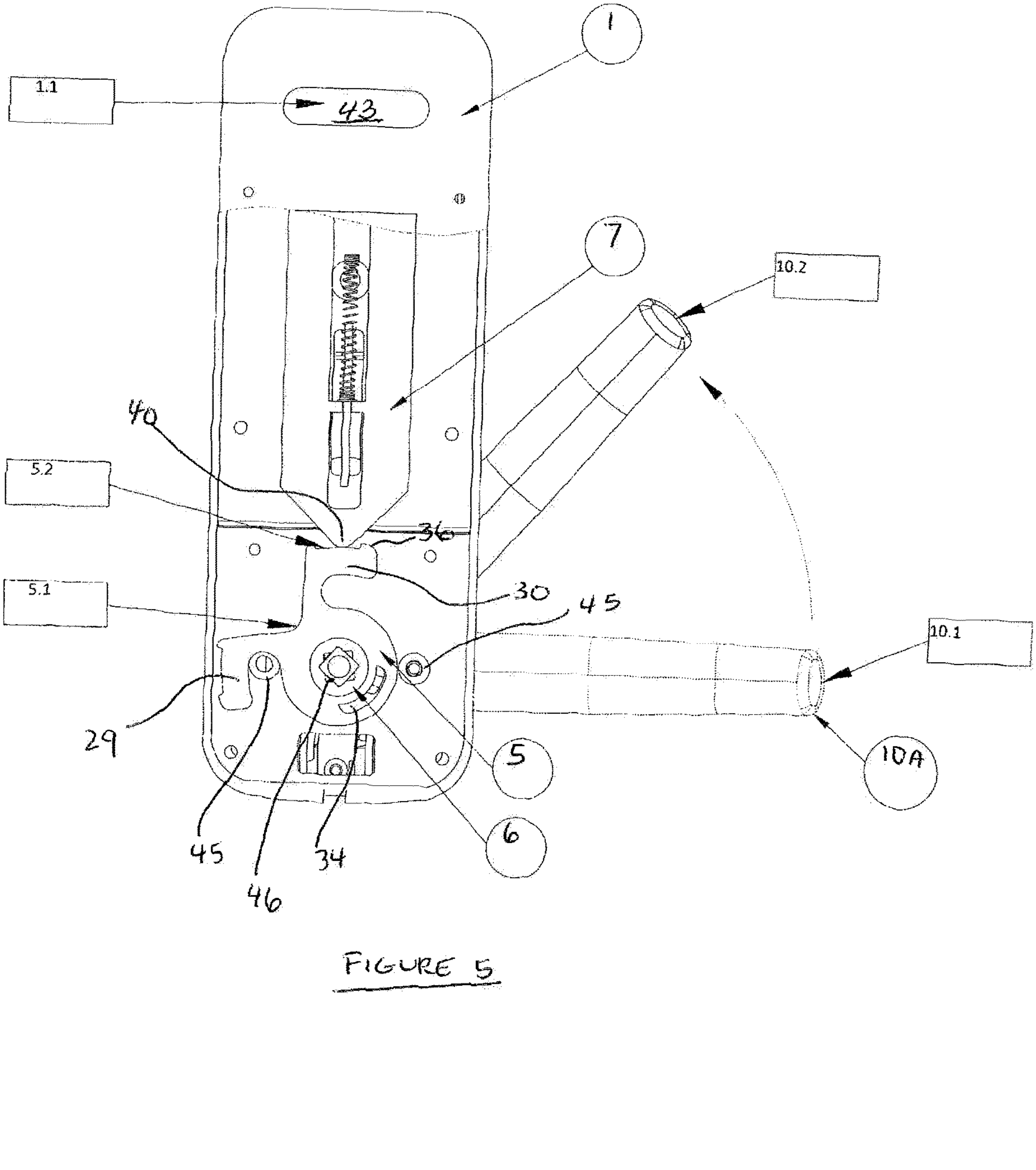
FIG. 5 illustrates the assembled indication box of FIG. 4 when the doorknob is released showing the cam not moving so the color plate remains in the upward vertical position, and only the dial head moving that is attached to the cam at an inner bottom position.

After completing the above actions, release the handle 10A of the outer unit or outside unit 11 allows the outside door handle 10A to automatically return to the horizontal position of 10.1, and at the same time, it will drive the dial 6 to rotate from the position 5.3 to the position 5.4. Since the positions 5.3 to 5.4 on the cam 5 are empty at this time. Thus the dial 6 cannot rotate the cam 5 at this time (see FIG. 5), so that the red color on the color plate 7 remains at the 1.1 position of the display window on the housing 1.

Figure 6:
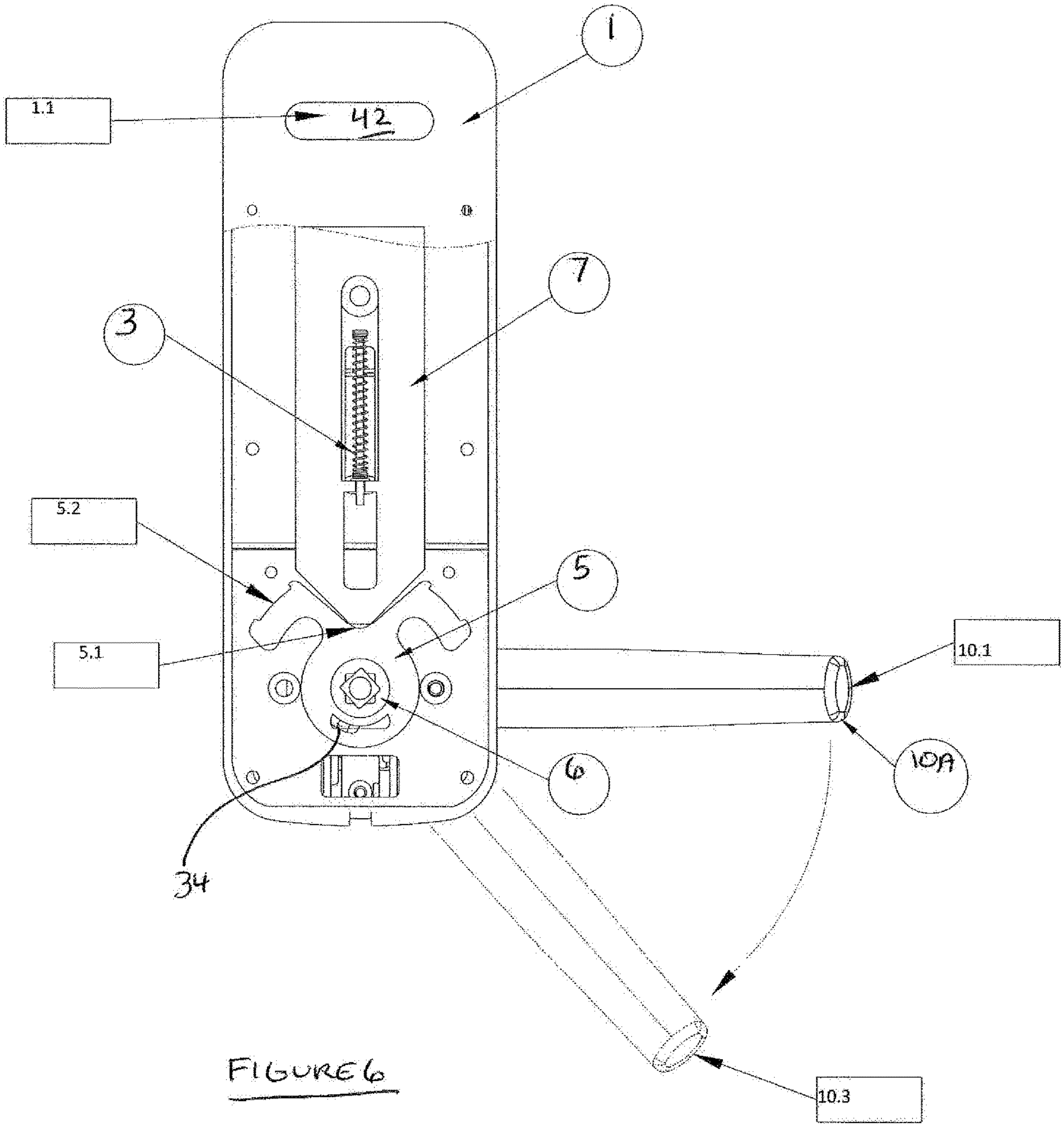
FIG. 6 illustrates when the user leaves the service room and the doorknob is again moved to move the dial head and cam so that the spring loaded color plate moves vertically downward back into its initial position indicating vacancy in the service room again.

After the indoor person finishes using the room or public service room and the like, the person will press down the inside handle 10 of the inner unit 14 to open the door and leave. At this time, the inside door handle 10 of the inner unit 14 is pressed down from positions 10.1 to 10.3. The inside door handle 10 of the inner unit drives 14 the dial 6 and the cam 5 to rotate at the same time. Thus, the color plate 7 moves from the 5.2 position on the cam 5 to position 5.1 by the elastic force of the spring 3. The color plate 7 is thus moved vertically and linearly downward (see FIG. 6), so that the display window 1.1 on the housing 1 is displayed in green, for example, indicating that the place is not in use or unoccupied. After completing this step, and release of the inside door handle 10 of the inner unit, the inside door handle 10 of the inner unit automatically returns to the horizontal state from position 10.3 to position 10.1 as shown in FIG. 6.

Figure 7:
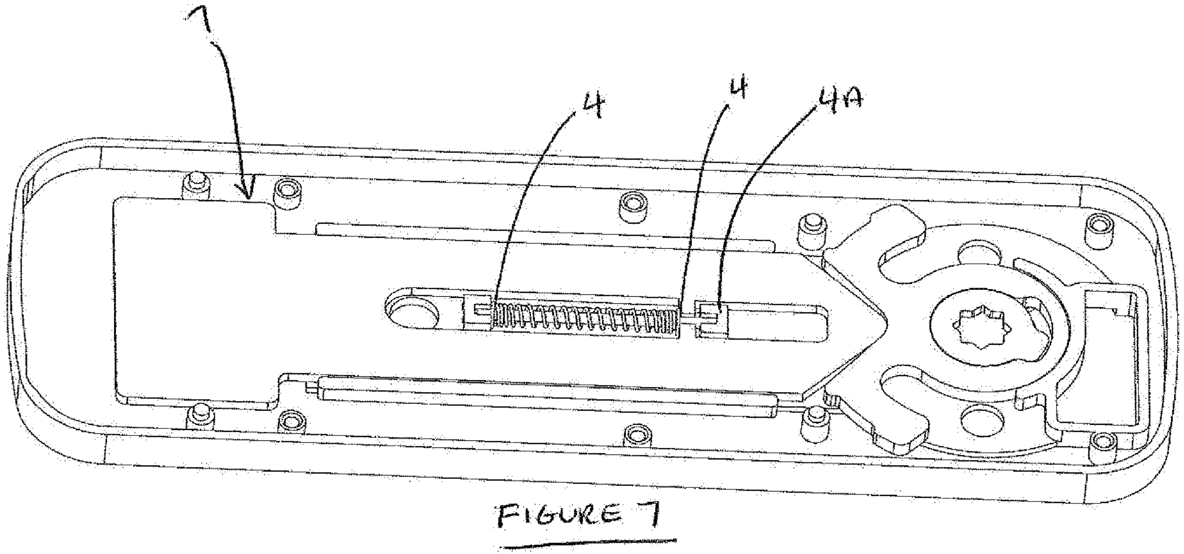
FIG. 7 illustrates one embodiment of the color plate showing placement of washers and a locking nut.

FIG. 7 illustrates one embodiment of the positioning of washers 4, two washers 4 located at each end of spring 3 with the shaft pin 2 going through holes in the middle of washers 4. As shown, the washers 4 secure the shaft pin 2 on the color plate 7 and provides resistance for spring 3. Depending on the implementation, a lock nut 4A may be utilized at one end of the shaft opposite the washer on the vertical canal 21 to further secure the shaft. The lock nut may provide further resistance to the spring disposed about the shaft.

Figure 8:
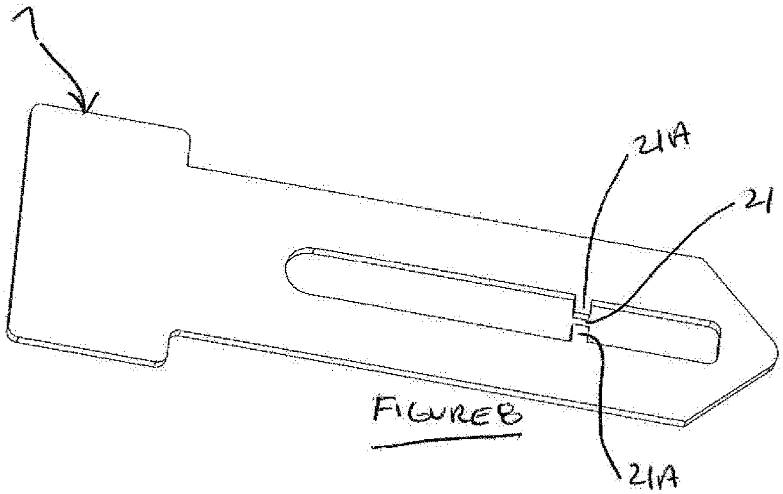
FIG. 8 illustrates one embodiment of the color plate showing positioning of a vertical canal and a plurality of tabs where the shaft in FIG. 7 is disposed therebetween.

As shown in FIG. 8, a plurality of tabs 21A define the vertical canal 21 on the color plate. The tabs 21A provide a base for the spring and resistance for the spring. Depending on the embodiment, one end of the shaft is disposed within the vertical canal 21 and held between tabs 21A as shown in FIG. 7.

The present disclosure further provides a room door lock having the indication box described in the above embodiments. The room door lock may comprise a smart lock having an inner unit with an inside door handle placed inside a room, and the smart lock further includes a control unit and an outer unit having an outside door handle outside a room with a door between the inner unit and the outer unit. The indication box is placed between the door and the outer unit.

In some embodiments, the room door lock may further comprise a magnet disposed in the indoor handle and a first hall sensor and a second hall sensor disposed in separate fixed parts of the indoor unit; wherein when the inside door handle is in a first state, the magnet is not paired with the first and the second hall sensors, and when the indoor handle is turned away from the first state to indicate the door is used the magnet is paired with the first hall sensor and a first signal is sent to the control unit.

When the control unit receives the first signal, the processor turns off any password, fingerprint, person re-identification (RE ID), or other door opening functions; and wherein the magnet pairs with the second hall sensor when the inside door handle is turned again as the user leaves the room, and the magnet and the second hall sensor generate a second signal sent to the control unit of the smart door lock to turn on any password, fingerprint, person re-identification (RE ID), or other door opening functions.

In another embodiment, when the room is not in use, the display window 1.1 or 24 on housing 1 of the indication box is displayed in green, indicating that the place is not in use (see FIG. 3). At this time, the inside door handle 10 is in a horizontal state, and a magnet 11A is separated from a first hall sensor referring as Hall 12 and a second referring as Hall 13 all in the indoor or inner unit 14 (see FIG. 9). The first Hall 12 and the second Hall 13 are a hall effect sensor that is activated by the magnet 11A. The hall effect sensors are a type of magnetic sensor which can be used for detecting the strength and direction of a magnetic field produced from a permanent magnet or an electromagnet with its output varying in proportion to the strength of the magnetic field being detected. These magnetic sensors convert magnetic or magnetically encoded information into electrical signals for processing by electronic circuits as further discussed herein. When a user wants to use a room with the device on the door, after entering the room, the user lifts the inside door handle 10 from 10.1 to 10.2 as shown in FIG. 4. When locked, the outside handle will not move the inside handle; when unlocked, the outside handle can move the inside handle, and the color plate may be moved too.

At this time, the inside handle 10 drives the dial 6. When the cam 5 rotates, the color plate 7 cooperates with the cam 5, and the color plate 7 will move from 5.1 to 5.2, so that the color plate 7 moves up in a linear and vertical direction. The display window 1.1 on the housing 1 then becomes red (see FIG. 4 and FIG. 5). The red indication is displayed when the room is in use.

Figure 10:
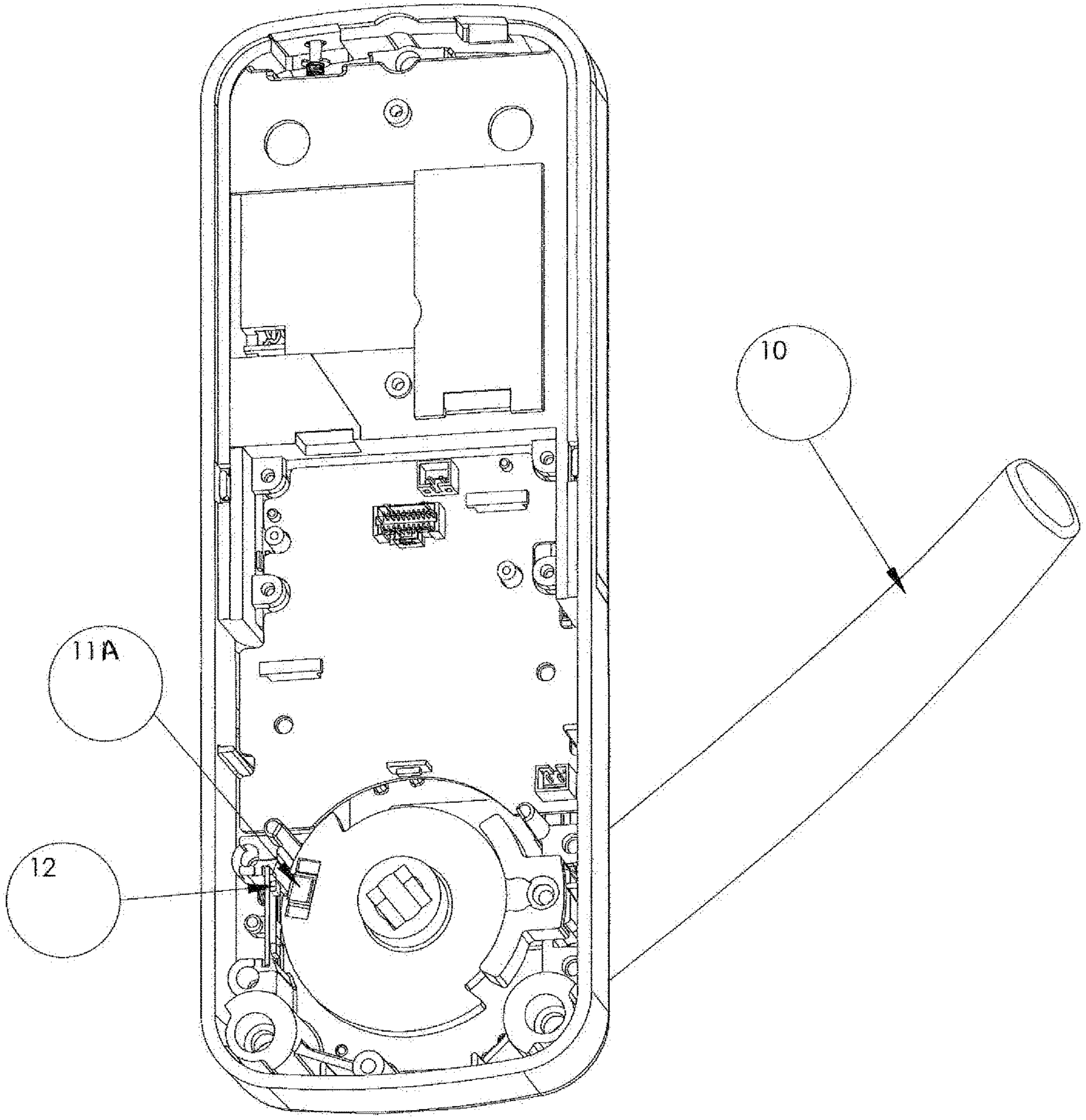
FIG. 10 illustrates one embodiment of the smart door lock having a magnet and hall effect sensors when the door lock is in a locked position when a user enters the room.

After completing the above actions, while lifting the inside door handle 10 will then make the magnet 11A pair with the first hall 12 that are both in the indoor unit or inner unit 14 (see FIG. 10), and send a signal to a processor 100 or control unit inside the smart door lock of the outdoor unit or outer unit 11. When the processor 100 in outer unit 11 receives this signal, it will turn off any password, fingerprint, personal re-identification (RE ID) and/or other door opening functions of the outdoor unit. For purposes of this disclosure, person re-identification (or Person Re-ID for short) is defined as matching people across disjoint camera views in a multi-camera system. It is useful for a number of public security applications such as intelligent camera surveillance systems.

Figure 9:
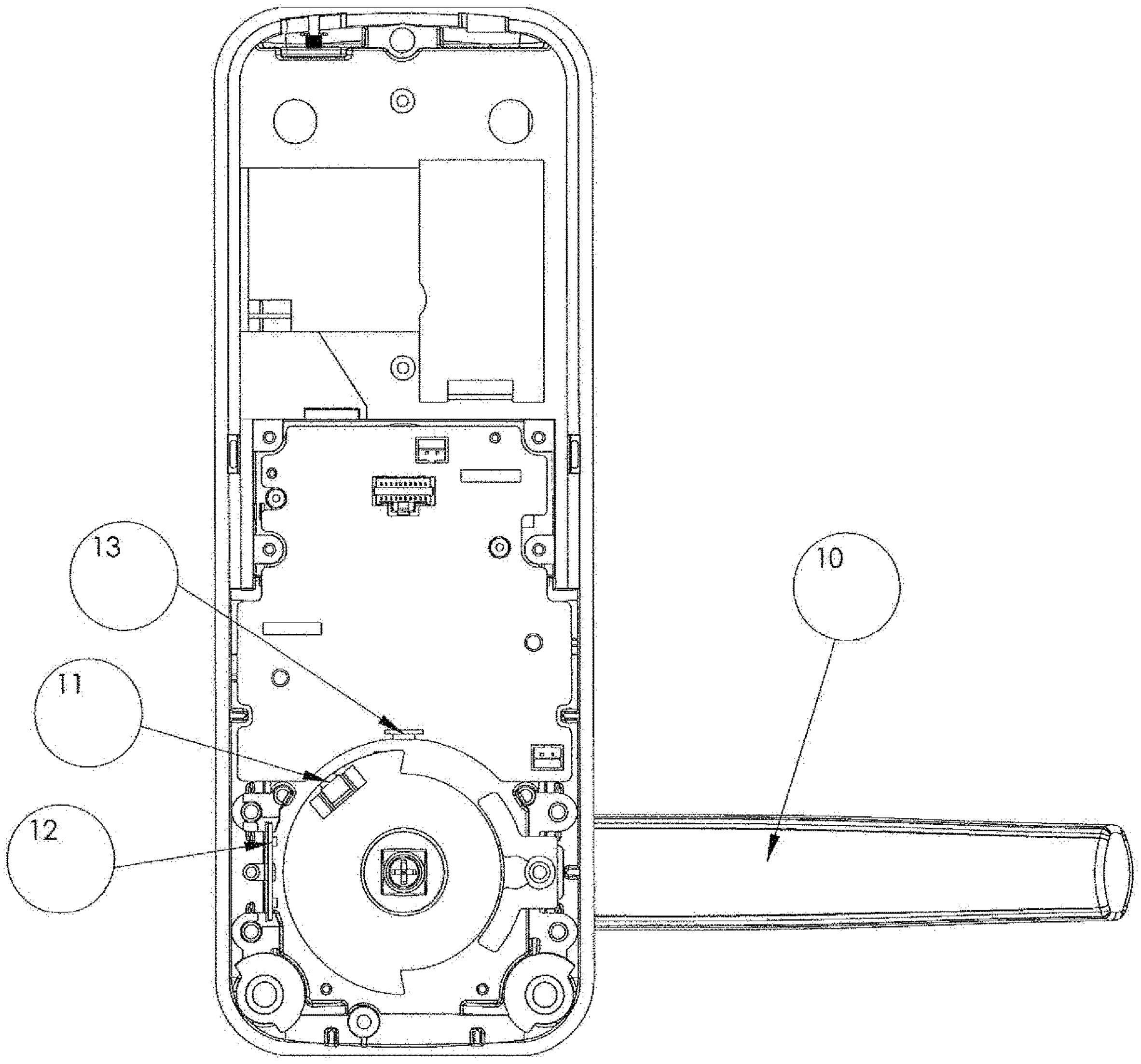
FIG. 9 illustrates one embodiment of the smart door lock having a magnet and hall effect sensors when the door lock is in an initial or unlocked position.

Then the user may release the indoor unit handle 10, the indoor unit handle 10 will automatically return to the level horizontal position 10.1 as shown in FIG. 4. This step returns the handle 10 to the horizontal state, the magnet 11A and the first Hall 12 are separated back to the original state (as shown in FIG. 9). At the same time, the dial 6 will be driven to rotate from 5.3 to 5.4 as shown in FIG. 4. At this time, the dial 6 cannot drive the cam 5 (see FIG. 4). Thus, the red color or second notification area on the color plate 7 remains at the position of the display window 1.1 on the housing 1.

Figure 11:
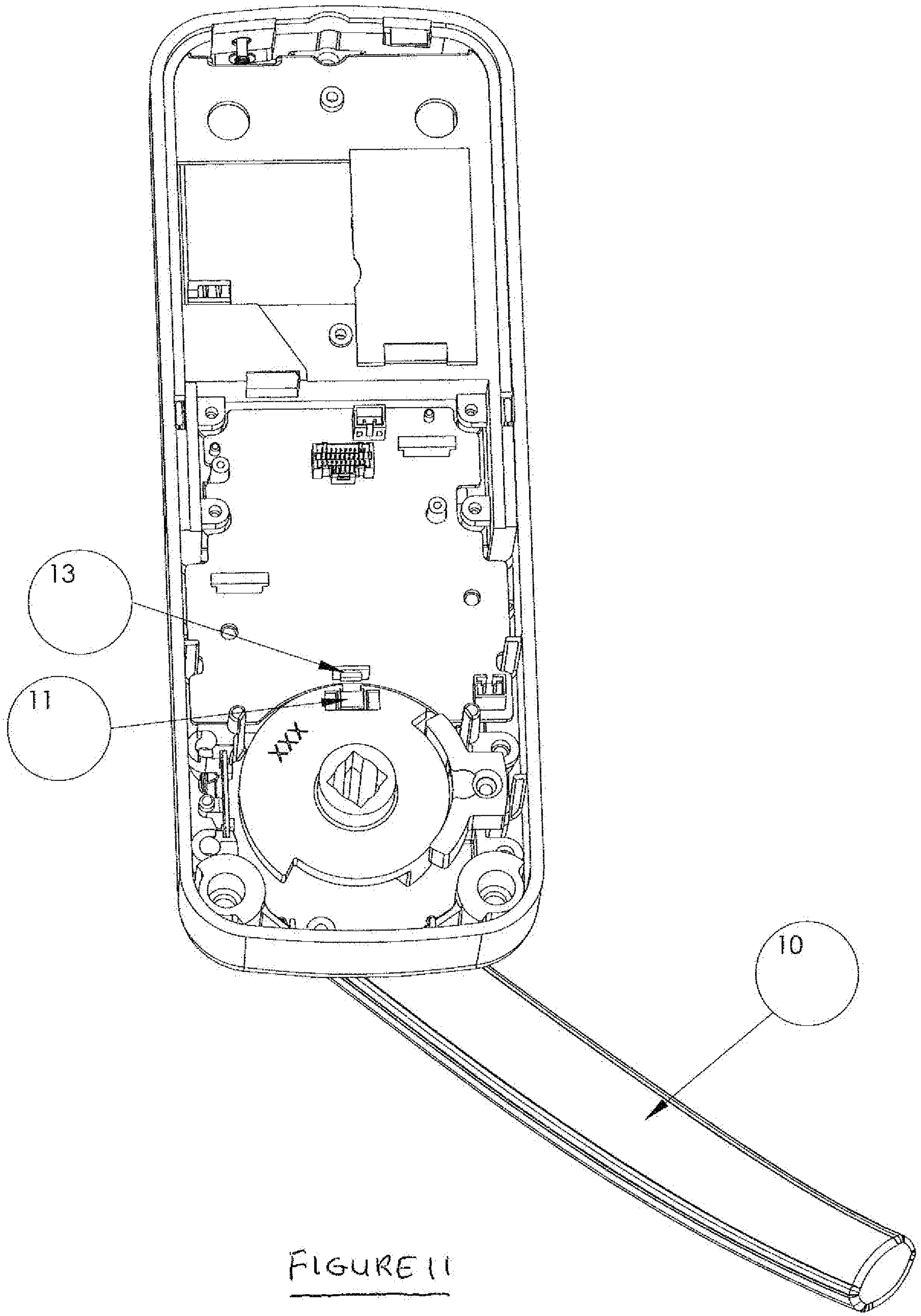
FIG. 11 illustrates one embodiment of the smart door lock having a magnet and hall effect sensors when the door lock is in a reset position when a user leaves the room.

When the user finishes using the room, the user can press down the indoor unit handle 10 to open the door and leave. At this time, the indoor unit handle 10 is pressed down from 10.1 to 10.3, the indoor unit handle 10 drives the dial 6 and the cam 5 to rotate at the same time, and the color plate 7 moves from position 5.2 to 5.1 on the cam 5 driven by the elastic force of the spring, so that the color plate 7 moves in a vertical and linear direction downward (see FIG. 6). The display window 1.1 on the housing 1 is displayed in green or first notification area, indicating that the room is unoccupied. At the same time, during the movement of pressing down on the indoor unit handle 10 of the indoor unit 14, the magnet 11A pair with the second Hall 13 both in the indoor unit 14, and send a second signal to the processor 100 in the smart door lock of the outer unit 11. When the processor 100 receives this second signal, it will open the door and also open functions of the outdoor unit such as password, fingerprint, and RE ID, and other identifiers (see FIG. 11).

After completing this step, release of the inside door handle 10 of the indoor unit 14, the handle 10 automatically returns from 10.3 to 10.1 to the horizontal state, and at the same time separates the magnet 11A from the second Hall 13 and returns to the original state (see FIG. 9).

Although the invention herein has been described with reference to particular embodiments, it is to be understood that these embodiments are merely illustrative of the principles and applications of the present invention.

It is therefore to be understood that numerous modifications may be made to the illustrative embodiments and that other arrangements may be devised without departing from the spirit and scope of the present invention as defined by the appended claims.

What is claims is:

1. An indication box for use with an electronic smart lock on a door, comprising:

a smart lock having an inner unit with an inside door handle placed inside a room, and an outer unit having an outside door handle outside a room with a door therebetween;

a housing having a front side, a back side, an upper portion, and a lower portion; the upper portion defining a display window; the lower portion further defining a first set of holes in horizontal alignment for insertion of the outer unit into the front side of the housing; the smart lock door outside door handle having at least two support rods and a door shaft therebetween in horizontal alignment for insertion into the first set of holes;

a bottom plate connected to the back side of the housing and disposed on a front of a door; the bottom plate further defining a second set of holes in horizontal alignment with the first set for insertion of the two support rods and the door shaft through the front of the door into the inner unit with the inside door handle;

a color plate having an upper portion and a V-shaped lower portion; the upper portion having a first notification area and a second notification area stacked on top of each other and facing the rectangular display window wherein only one notification area is shown in the display window at a time; the color plate disposed between the housing and the back plate;

a spring disposed within the color plate; the spring having a shaft pin therethrough;

a cam disposed below the color plate a; the cam defining a cam hole in a center of the cam to receive the door shaft to pass therethrough; wherein the door shaft does not rotate the cam;

wherein, the cam further having a left and a right L-shaped tabs that are mirror images of each other on a top of the cam forming a V-shaped recess therebetween to hold the V-shaped lower portion of the color plate in a stationary position when the spring is uncompressed;

wherein, the left and right L-shaped tabs each having a cam depression with two releasable snap-fittings on both ends of each of the cam depression to hold the V-shaped lower portion of the color plate inside the depression of the cam when the cam moves so the color plate can move upward in the linear vertical direction to compress the spring;

a circular dial head disposed within the cam hole; the circular dial head further defining a dial head hole having a plurality of segregated teeth therein; the cam hole for receiving the door shaft to move the dial head within the cam;

the circular dial head further having a protrusion that is in communication with a semi-circular recess of the bottom of the cam; wherein the protrusion moves the cam when the inside door handle is turned;

wherein when the spring is uncompressed, the color plate is at the stationary position and the V-shaped bottom is within the V-shaped recess for showing the first notification area on the color plate in the display window of the housing; and wherein the spring is compressed when the inside door handle is initially turned, the color plate moves upward in a linear vertical direction and the second notification area on the color plate is shown in the display window of the housing;

wherein, the spring remains compressed when the inside door handle is released for the second notification area on the color plate to be continually shown in the window as the V-shaped lower portion of the color plate is held inside the depression of the cam of the right L-shaped tab to indicate an occupied status of a room; and wherein, when the inside door handle is turned the V-shaped lower portion of the color plate fits therebetween the V-shaped recess of the cam to show the first notification area again in the window of the housing as the compressed spring mechanically pushes the color plate in a downward linear vertical direction without use of electrical power from the smart lock to indicate an unoccupied status of the room.

2. The indication box according to claim 1, further comprising:

a magnet disposed in the indoor handle and a first hall sensor and a second hall sensor all disposed in fixed parts of the indoor unit, wherein when the inside door handle is in a first state, the magnet is not paired with the first and the second hall sensors, and when the indoor handle is turned away from the first state the magnet is paired with the first hall sensor or the second hall sensor.

3. The indication box of claim 2, wherein the magnet pairs with the first hall inside the inner unit when the inside door handle is turned after a user enters the room, and the magnet and the first hall generate a first signal sent to a processor inside the smart door lock.

4. The indication box of claim 3, wherein, when the processor receives the first signal, the processor turns off any password, fingerprint, person re-identification (RE ID), or other door opening functions; and wherein the magnet pairs with the second hall sensor when the inside door handle is turned again as the user leaves the room, and the magnet and the second hall sensor generate a second signal sent to a processor inside the outer unit of the smart door lock to turn on any password, fingerprint, person re-identification (RE ID), or other door opening functions.

5. The indication box of claim 1, wherein the first notification area and the second notification area are assorted colors.

6. The indication box of claim 5, wherein the first notification area is a color green, and the second indication area is a color red.

7. The indication box of claim 1, wherein the first notification area and the second notification area include color, indicia, symbols, pictures, or braille to indicate when the public service room is available and when the public service room is occupied.

8. The indication box of claim 1, further comprising:

a plurality of fasteners or screws entering from the bottom plate into the housing for assembly of the indication box.

9. The indication box of claim 1, wherein when the inside door handle is initially turned, the left tab stops movement of the cam by resting on one of the support rods of the outside or the inside door handle.

10. An indication box for use with an electronic smart lock on a public service room door, comprising:

a housing defining a display window and a first set of holes for insertion of an outer unit of a smart lock having an outside door handle that is inserted into the front side of the housing, and wherein an inner unit of the smart lock having an inside door handle receives a shaft of the outside door handle through a door;

a bottom plate connected to the back side of the housing and disposed on a front of a public service room door;

a color plate having a square shaped upper portion and a V-shaped lower portion; the square shaped upper portion having a first and a second notification areas stacked thereon and facing the rectangular display window; a spring with a shaft pin therethrough disposed within the color plate;

a cam disposed below the color plate to receive a door shaft to pass therethrough; a circular dial head disposed within a cam hole having a plurality of segregated teeth for receiving the door shaft wherein the door shaft through movement of the inside door handle moves the dial head within the cam and then moves the cam to move the color plate in an upward linear and vertical direction to show the second notification area in the window and indicate an occupied status of the room.

11. The indication box of claim 10, wherein the housing is rectangular.

12. The indication box of claim 11, wherein the cam also defines a semi-circular recess on a bottom of the cam, and the circular dial head further has a protrusion that is in cooperation with the semi-circular recess of the bottom of the cam; wherein the protrusion moves the cam when the inside door handle is turned.

13. The indication box of claim 12, wherein, the cam further has a left L-shaped tab and a right L-shaped tab, the left and the right L-shaped tabs are mirror images of each other and disposed on a top of the cam for forming a V-shaped recess therebetween; wherein the V-shaped recess holds the V-shaped lower portion of the color plate in a stationary position when the spring is uncompressed to show the first notification area in the window and indicate the room is unoccupied.

14. The indication box of claim 13, wherein, the left and right L-shaped tabs each have a cam depression with two releasable snap-fittings on both ends of each of the cam depression to hold the V-shaped lower portion of the color plate inside the depression of the cam when the cam moves so the color plate can move upward in the linear vertical direction to compress the spring to show the second notification area in the window and indicate the room is occupied.

15. The indication box of claim 14, wherein, the spring remains compressed when the inside door handle is released for the second notification area on the color plate to be continually shown in the window as the V-shaped lower portion of the color plate is held inside the depression of the cam of the right L-shaped tab to indicate an occupied status of the public service room.

16. The indication box of claim 15, wherein, when the inside door handle is turned again, the V-shaped lower portion of the color plate fits therebetween the V-shaped recess of the cam to show the first notification area again in the window of the housing as the compressed spring elastically pushes the color plate in a downward linear vertical direction without use of electrical power from the electronic smart lock to indicate an unoccupied status of the public service room.

17. The indication box of claim 11, wherein the housing fits with any smart lock door design.

18. A room door lock, comprising:

a smart lock having an inner unit with an inside door handle placed inside a room; and the smart lock further including a control unit and an outer unit having an outside door handle outside a room with a door between the inner unit and the outer unit;

an indication box between the door and the outer unit; the indication box comprising:

a housing defining a display window and a first set of holes for insertion of an outer unit of a smart lock having an outside door handle that is inserted into the front side of the housing, and wherein an inner unit of the smart lock having an inside door handle receives a shaft of the outside door handle through a door;

a bottom plate connected to the back side of the housing and disposed on a front of a public service room door;

a color plate having a square shaped upper portion and a V-shaped lower portion; the square shaped upper portion having a first and a second notification areas stacked thereon and facing the rectangular display window; a spring with a shaft pin therethrough disposed within the color plate;

a cam disposed below the color plate to receive a door shaft to pass therethrough; a circular dial head disposed within a cam hole having a plurality of segregated teeth for receiving the door shaft wherein the door shaft through movement of the inside door handle moves the dial head within the cam and then moves the cam to move the color plate in an upward linear and vertical direction to show the second notification area in the window and indicate an occupied status of the room.

19. The room door lock of claim 18, further comprising:

a magnet disposed in the indoor handle and a first hall sensor and a second hall sensor disposed in separate fixed parts of the indoor unit; and wherein when the inside door handle is in a first state, the magnet is not paired with the first and the second hall sensors, and when the indoor handle is turned away from the first state to indicate the door is used the magnet is paired with the first hall sensor and a first signal is sent to the control unit.

20. The room door lock of claim 19, wherein, when the control unit receives the first signal, the processor turns off any password, fingerprint, person re-identification (RE ID), or other door opening functions; and wherein the magnet pairs with the second hall sensor when the inside door handle is turned again as the user leaves the room, and the magnet and the second hall sensor generate a second signal sent to the control unit of the smart door lock to turn on any password, fingerprint, person re-identification (RE ID), or other door opening functions.

* * * * *